United States Patent
Mo et al.

(10) Patent No.: US 8,730,207 B2
(45) Date of Patent: May 20, 2014

(54) METHOD OF DRIVING AND DETECTION FOR CAPACITIVE TOUCH SCREEN AND DEVICE THEREOF

(75) Inventors: Lianghua Mo, Shenzhen (CN); Junqiao Liu, Shenzhen (CN)

(73) Assignee: Focaltech Systems, Ltd., George Town, Grand Cayman (KY)

( * ) Notice: Subject to any disclaimer, the term of this patent is extended or adjusted under 35 U.S.C. 154(b) by 109 days.

(21) Appl. No.: 13/561,439

(22) Filed: Jul. 30, 2012

(65) Prior Publication Data

US 2013/0314366 A1 Nov. 28, 2013

(30) Foreign Application Priority Data

May 23, 2012 (CN) .......................... 2012 1 0163078

(51) Int. Cl.
 *G06F 3/045* (2006.01)
(52) U.S. Cl.
 USPC .......................................................... 345/174
(58) Field of Classification Search
 CPC ..................................................... G06F 3/045
 USPC ................................................. 345/174, 179
 See application file for complete search history.

(56) References Cited

U.S. PATENT DOCUMENTS

| 2012/0105361 A1* | 5/2012 | Kremin et al. ................ 345/174 |
| 2012/0105362 A1* | 5/2012 | Kremin et al. ................ 345/174 |
| 2013/0207938 A1* | 8/2013 | Ryshtun et al. ............... 345/179 |

\* cited by examiner

*Primary Examiner* — Fred Tzeng
(74) *Attorney, Agent, or Firm* — Harness, Dickey & Pierce, P.L.C.

(57) ABSTRACT

A method of driving and detection for a capacitive touch screen and a device thereof are provided. The method includes: sending, from a driving side, excitation signals through a plurality of channels simultaneously during the same driving and detection time period; receiving, by each of receiving channels at a receiving side, a charge signal generated from the excitation signals through coupling capacitances at corresponding touch detection points, and performing detection, which includes: converting and amplifying the charge signal into a voltage signal, and performing signal demodulation and analog-to-digital conversion on the voltage signal; and storing digital signals obtained from the analog-to-digital conversion, and analyzing the digital signals by a controller to obtain a detection result. This can achieve rapid scan, increase frame rate in detection, and meet the rapidity requirement for performing display driving and touch detection at different time slots.

10 Claims, 5 Drawing Sheets

METHOD OF DRIVING AND DETECTION FOR CAPACITIVE TOUCH SCREEN AND DEVICE THEREOF

This application claims the benefit of Chinese patent application No. 201210163078.6 filed on May 23, 2012 and titled "METHOD OF DRIVING AND DETECTION FOR CAPACITIVE TOUCH SCREEN AND DEVICE THEREOF", which is incorporated herein by reference in its entirety.

FIELD OF THE INVENTION

The present invention relates to the field of detection technology for capacitive touch screens, and in particular to a method of driving and detection for a capacitive touch screen and a device thereof.

BACKGROUND OF THE INVENTION

Currently, capacitive touch screens are widely applied in various electronic products such as smart phones and tablet computers. With the popularization and application of electronic terminals, the size of capacitive touch screens continues to increase, ranging from 2 to 3.5 inches in smart phones to about 10 inches in tablet computers. Future applications of capacitive touch screens may include the smart TV interface, and integration of a touch screen and a liquid crystal display (LCD), e.g., the in-cell technology. The environment in which a capacitive touch screen is applied in an electronic product is complex, which may involve various interferences such as interferences from the LCD, from a wireless communication module or from a switched-mode power supply. By detecting the frequency band with interferences, corresponding anti-interference measures such as frequency modulation and spread spectrum can be adopted to enhance the accuracy of detecting the location of a touch on the capacitive touch screen. A common detection method for capacitive touch screens is described below.

Figure 1:
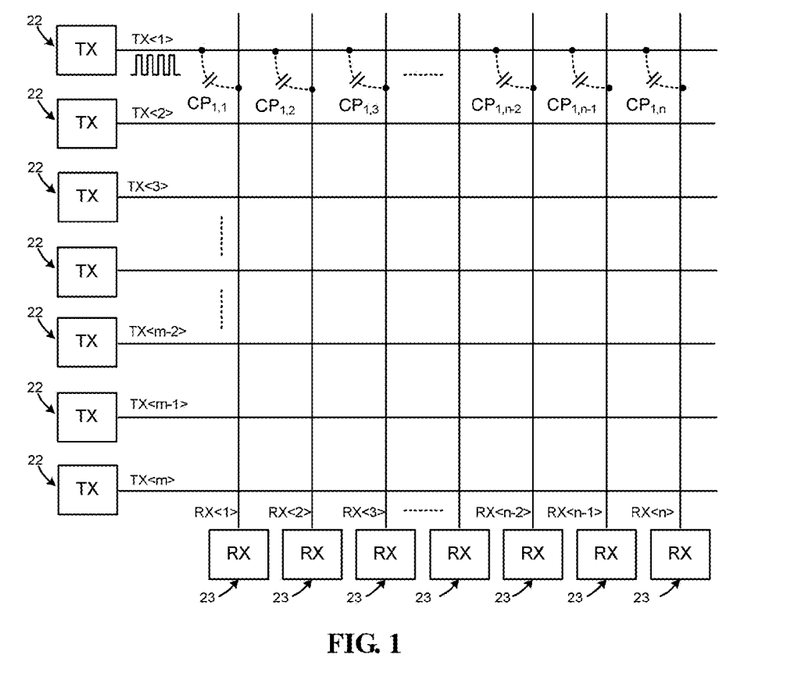
FIG. 1 is a schematic diagram illustrating the wirings of a driving and detection method in the prior art.
Figure 2:
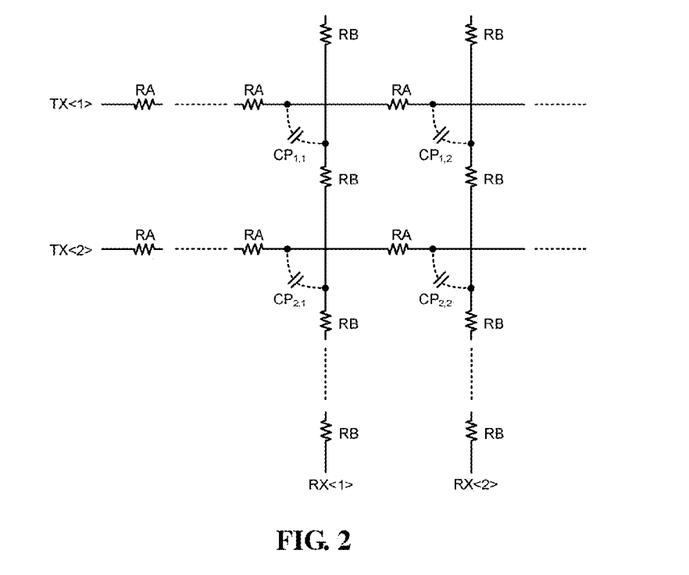
FIG. 2 is a structural diagram illustrating resistances in the wirings of a driving and detection method in the prior art.

As shown in FIG. 1, in an Indium tin oxide (ITO) overlay 10, TX<1>, TX<2>, ..., TX<m> in the horizontal direction are the driving side (collectively referred to as TXs hereinafter), and RX<1>, RX<2>, ..., RX<n> in the vertical direction are the receiving side (collectively referred to as RXs hereinafter). Mutual capacitance occurs between the layers of TXs and RXs of the ITO overlay. For example, a coupling capacitance $CP_{2,2}$ occurs at the intersection of TX<2> and RX<2>, forming a touch detection point 11. During scanning, each time only one of the TXs 22 sends an excitation signal (e.g., in FIG. 2, TX<1> is driven by a square-wave excitation signal), and the other TXs are all driven to a fixed level (e.g., ground or power supply). For example, the TXs may be driven in the order: TX<1> –> TX<2> ... –> TX<m>. Meanwhile, the receiving modules RXs 23 in the vertical direction all perform excitation signal detection. Once a TX 22 finishes sending the excitation signal, it is driven to the fixed level; and the RXs 23 report the detection results to storage. Then the next TX 22 starts sending an excitation signal, and the RXs 23 all start another round of detection. When all the TXs 22 have finished, the detection of a frame completes. Supposing the time for a round of detection for a TX 22 is Ts, the time for completing the detection of a frame is m*Ts, resulting in a frame rate of 1/(m*Ts). As shown in FIG. 2, RA represents a line resistance between two touch points in a TX channel, and RB represents a line resistance between two touch points in a RX channel. The resistances in TX and RX channels affect the selection for the frequency of the excitation signal. The larger the resistance in a channel, the more the time for the capacitor to be charged/discharged, causing lowered TX scan frequency, and thereby reducing the frame rate.

The sizes of capacitive touch screens in existing smart phones (e.g., 5 inches) and tablet computers (e.g., 10 inches) are relatively small. As a result, the resistance in a TX or RX channel is small, so is the number of TX channels m, which permit a high scan frequency, and thereby a high frame rate. However, for a capacitive touch screen to be used in, e.g., a smart TV with a large human-machine interface, the distance between ITO wirings is maintained while the number of TX channels m is increased significantly; as a result, TXs will be driven at a low frequency, resulting in greatly reduced frame rate. In addition, in such technologies as in-cell, in order to reduce the noise in touch detection, display (e.g., LCD) driving and touch detection are performed at different time slots, which also requires rapid TX scan. Therefore, when used in a large human-machine interface, the existing driving and detection method has the problem of increased resistances in the wirings, reduced frame rate and reduced scan speed and also fails to meet the rapidity requirement for performing display driving and touch detection at different time slots.

SUMMARY OF THE INVENTION

In view of this, an embodiment of the present invention provides a method of driving and detection for a capacitive touch screen and a device thereof, to achieve rapid scan and increased frame rate in detection and to meet the rapidity requirement for performing driving and touch detection at different time slots.

A method of driving and detection for a capacitive touch screen is provided, including:
sending, from a driving side, excitation signals through a plurality of channels simultaneously during the same driving and detection time period, with excitation signals in at least two of the plurality of channels having different frequencies;
receiving, by each of receiving channels at a receiving side, a charge signal generated from the excitation signals through coupling capacitances at corresponding touch detection points, and performing detection, which includes:
converting and amplifying the charge signal into a voltage signal, and performing signal demodulation and analog-to-digital conversion on the voltage signal; and
storing digital signals obtained from the analog-to-digital conversion, and analyzing the digital signals by a controller to obtain a detection result.

Preferably,
the step of sending, from a driving side, excitation signals through a plurality of channels simultaneously during the same driving and detection time period, with excitation signals in at least two of the plurality of channels having different frequencies includes:
driving, by a driving module TX during the same driving and detection time period, i channels simultaneously to send excitation signals having different frequencies.

The method may further include:
outputting the digital signals obtained from the analog-to-digital conversion and performing Fourier analysis on the digital signals, to obtain a power spectrum over the frequencies.

The step of receiving, by each of receiving channels at a receiving side, a charge signal generated from the excitation signals through coupling capacitances at corresponding touch detection points, and performing detection, while the excitation signals are being sent may include:

while the excitation signals having different frequencies are being sent through the i channels, receiving, by a receiving module RX through each of the n channels in the vertical direction, i charge signals caused by the driving module TX, with i*n touch detection points formed by all the n RX channels and the i TX channels; and adding the charge signals generated from the excitation signals in the i TX channels through coupling capacitances at i touch detection points, to form a charge signal received by the RX.

The step of converting and amplifying the charge signal into a voltage signal, and performing signal demodulation and analog-to-digital conversion on the voltage signal may include:

converting and amplifying, by an amplifier, the charge signal into a voltage signal;

inputting the voltage signal into i signal demodulation modules, to obtain i demodulated signals; and inputting the i demodulated signals into i digital-to-analog converters connected with the signal demodulation modules, to obtain i digital signals: DATA1 to DATAi.

The step of driving, by a driving module TX, i channels simultaneously to send excitation signals having different frequencies may include:

driving, by the driving module TX, 3 channels simultaneously to send the excitation signals having different frequencies; and driving another 3 channels at a starting point of the next driving and detection time period.

A device of driving and detection for a capacitive touch screen is provided, including:

a driving module, adapted to send, from a driving side, excitation signals through at least two channels simultaneously during the same driving and detection time period;

a receiving module, adapted to, while the excitation signals are being sent, receive, through each of receiving channels, a charge signal generated from the excitation signals through coupling capacitances at corresponding touch detection points, and to perform detection including:

converting and amplifying the charge signal into a voltage signal, and performing signal demodulation and analog-to-digital conversion on the voltage signal; and storing digital signals obtained from the analog-to-digital conversion into a storage module, and analyzing the digital signals by a controller to obtain a detection result; and an oscillator, the controller and the storage module, the storage module being adapted to store the detection result.

Preferably, the receiving module includes: a power spectrum obtaining module, adapted to output the digital signals obtained from the analog-to-digital conversion and to perform Fourier analysis on the digital signals, to obtain a power spectrum over the frequencies.

The receiving module may include:

an amplifier;

i signal demodulation modules connected to an output terminal of the amplifier; and i analog-to-digital conversion modules connected to output terminals of the signal demodulation modules, with output terminals of the i analog-to-digital conversion modules connected to an input terminal of the storage module, i being the number of the channels simultaneously driven by the driving module TX.

Preferably, i, the number of the channels simultaneously driven by the driving module TX, is 3.

It can be seen, that according to the method of driving and detection for a capacitive touch screen, the driving side sends excitation signals through a plurality of channels simultaneously during the same driving and detection time period, with excitation signals in at least two of the plurality of channels having different frequencies; and the receiving channels all perform receiving and processing, to output a power spectrums over the different frequencies. And in the device corresponding to the method, it is provided a signal demodulation module and an analog-to-digital conversion module for demodulation and analog-to-digital conversion on the frequencies. Therefore, rapid scan is achieved, the problem in the prior art with large size capacitive touch screens that scan frequency and frame rate are reduced because of the increased number of TX channels is avoid, frame rate in detection is increased, and the rapidity requirement for performing display driving and touch detection at different time slots can be met.

BRIEF DESCRIPTION OF THE DRAWINGS

For a better understanding of the technical solutions in the embodiments of the present invention and in the prior art, accompanying drawings used in the description of the prior art and the embodiments of the present invention are briefly described below. Clearly, the accompanying drawings described herein are merely some embodiments of the present invention, and other drawings can be obtained by those skilled in the art based on these drawings without inventive effort.

DETAILED DESCRIPTION OF THE EMBODIMENTS

In the interests of reference and clarity, the following technological terms are used in their abbreviation forms:

LCD: Liquid Crystal Display.

The technical solutions in the embodiments of the present invention will be described in detail hereinafter in conjunction with the accompanying drawings. Clearly, the embodiments described herein are merely some embodiments of the present invention. Any other embodiment obtained by those skilled in the art based on the embodiments described herein without inventive effort shall fall within the scope of protection of the present invention.

An embodiment of the present invention provides a method of driving and detection for a capacitive touch screen and a device thereof, to achieve rapid scan and increased frame rate in detection and to meet the rapidity requirement for performing driving and touch detection at different time slots.

Before going into the details, it is noted that the method of driving and detection for a capacitive touch screen according to an embodiment of the present invention is applicable to noise testing for large size capacitive touch screens and driving and touch detection in in-cell scenarios.

Figure 3:
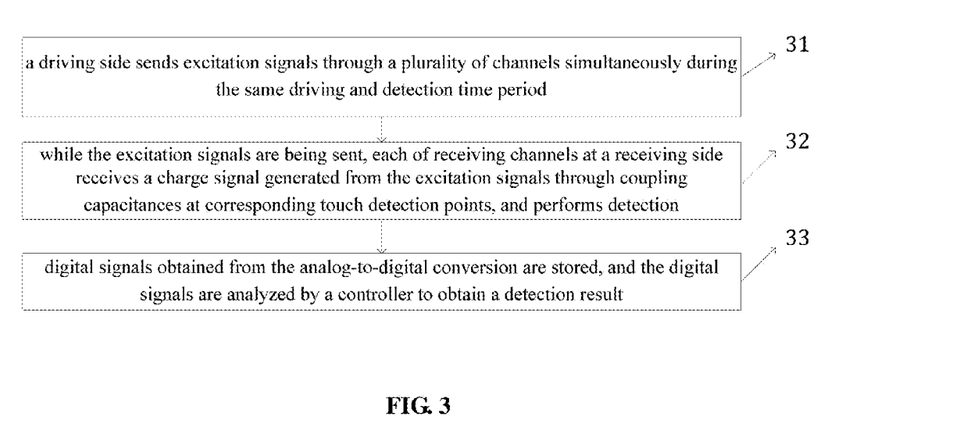
FIG. 3 is a flow chart of a method of driving and detection for a capacitive touch screen according to an embodiment of the present invention.

FIG. 3 shows a method of driving and detection for a capacitive touch screen, including the following steps.

Step 31: a driving side sends excitation signals through a plurality of channels simultaneously during the same driving and detection time period, with excitation signals in at least two of the plurality of channels having different frequencies.

The selection of channels at the driving side may be done according to actual needs. Of the m channels, i channels may be triggered each time; and the frequencies of the triggered channels may be set as required by the detection in the presence of interferences from the LCD, a wireless communication module, a switched-mode power supply, etc.

Step 32: while the excitation signals are being sent, each of receiving channels at a receiving side receives a charge signal generated from the excitation signals through coupling capacitances at corresponding touch detection points, and performs detection including:

converting and amplifying the charge signal into a voltage signal, and performing signal demodulation and analog-to-digital conversion on the voltage signal; then proceed to step 33.

Step 33: digital signals obtained from the analog-to-digital conversion are stored, and the digital signals are analyzed by a controller to obtain a detection result.

In the embodiment, specifically, the steps of the detection method may further include:

outputting the digital signals obtained from the analog-to-digital conversion and performing Fourier analysis on the digital signals, to obtain a power spectrum over the frequencies. From the power spectrum, noise distribution can be learned, which enables better selection for the frequencies of the signals sent by the driving side, and thereby a better detection result.

In the embodiment, a plurality of channels are driven with different frequencies, and the receiving channels all perform receiving and processing independently; therefore, the problem in the prior art with large size capacitive touch screens that scan speed is reduced because of the increased resistances in the wirings and the increased number of driving channels is avoided, so is the problem associated with in-cell technology that the rapidity requirement for performing display (e.g., LCD) driving and touch detection at different time slots cannot be met.

A specific implementation of the present invention is described below with the following preferred embodiment.

Figure 4A:
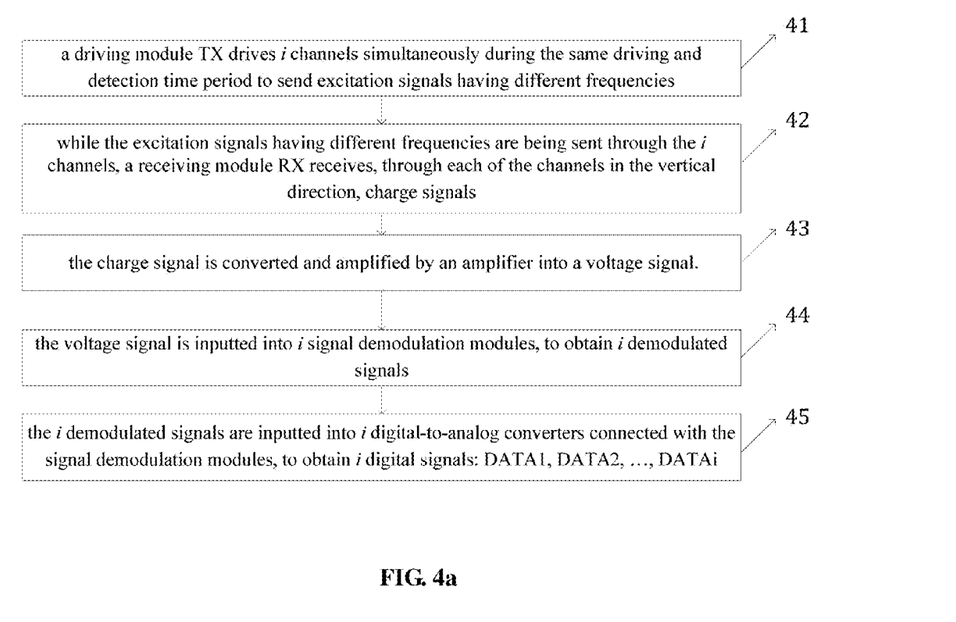
FIG. 4a is a flow chart of a method of driving and detection for a capacitive touch screen according to another embodiment of the present invention.

FIG. 4a shows another method of driving and detection for a capacitive touch screen, which includes the following steps.

Step 41: a driving module TX drives i channels simultaneously during the same driving and detection time period to send excitation signals having different frequencies.

In the embodiment, the number of the driving modules and the number of the receiving modules are m and n, respectively.

Figure 4B:
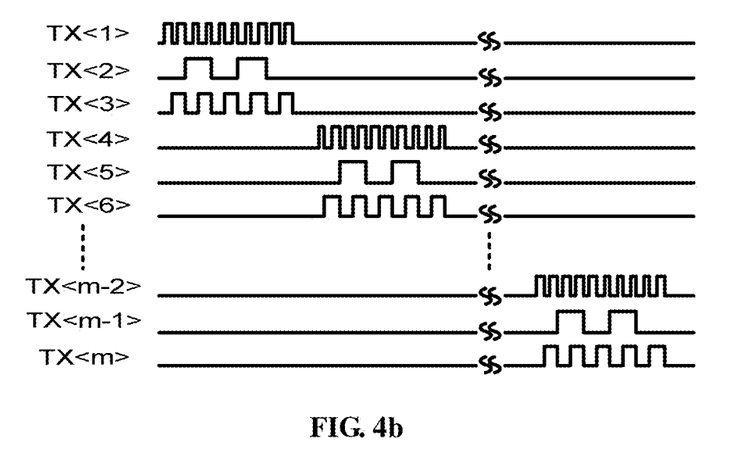
FIG. 4b is a sequence diagram of a method of driving and detection for a capacitive touch screen according to another embodiment of the present invention.

In the interest of clarity, the number of the driving channels is set i=3; however, the setting of i is not limited to that used in the embodiment. The driving order may be that 3 TX channels are driven simultaneously each time, for example, TX<1> TX<2> TX<3> –> TX<4> TX<5> TX<6> –> . . . –> TX<m-2> TX<m-1> TX<m>. That is, at the starting point of the next driving and detection time period, according to an order, another 3 channels are driven; and the frequencies of the 3 channels in this round are not necessarily the same as those in the last round, as shown in FIG. 4b.

Step 42: while the excitation signals having different frequencies are being sent through the i channels, a receiving module RX receives, through each of the n channels in the vertical direction, i charge signals caused by the driving module TX, with i*n touch detection points formed by all the n RX channels and the i TX channels.

Figure 4C:
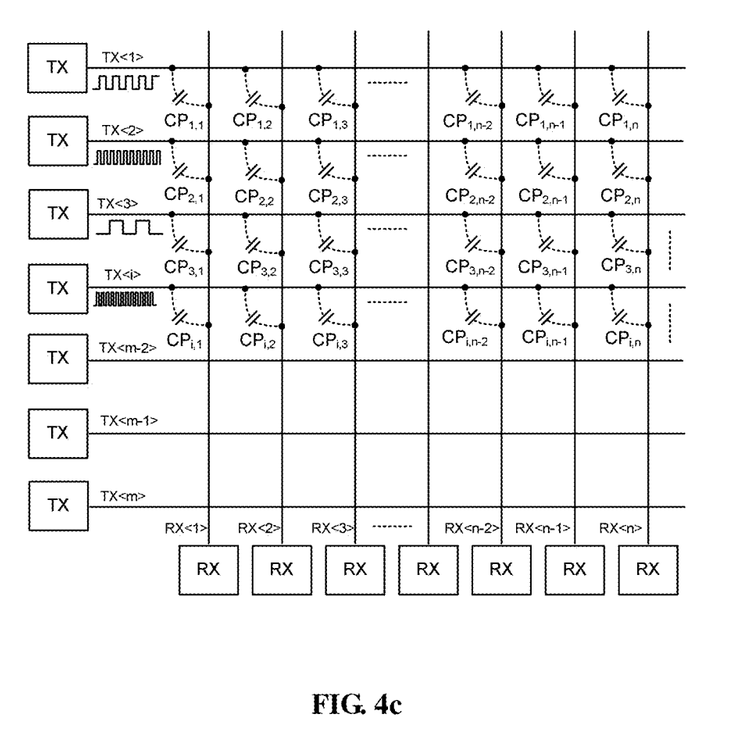
FIG. 4c illustrates the scenario of a method of driving and detection for a capacitive touch screen according to another embodiment of the present invention.

It can be seen from FIG. 4c that the excitation signals in the i TX channels are all received by the same RX in the vertical direction through coupling capacitances; and the charge signals generated from the excitation signals in the i TX channels through coupling capacitances at i touch detection points are added to form the charge signal received by the RX.

Step 43: the charge signal is converted and amplified by an amplifier into a voltage signal.

Step 44: the voltage signal is inputted into i signal demodulation modules, to obtain i demodulated signals.

Step 45: the i demodulated signals are inputted into i digital-to-analog converters connected with the signal demodulation modules, to obtain i digital signals: DATA1, DATA2, . . . , DATAi.

Figure 6:
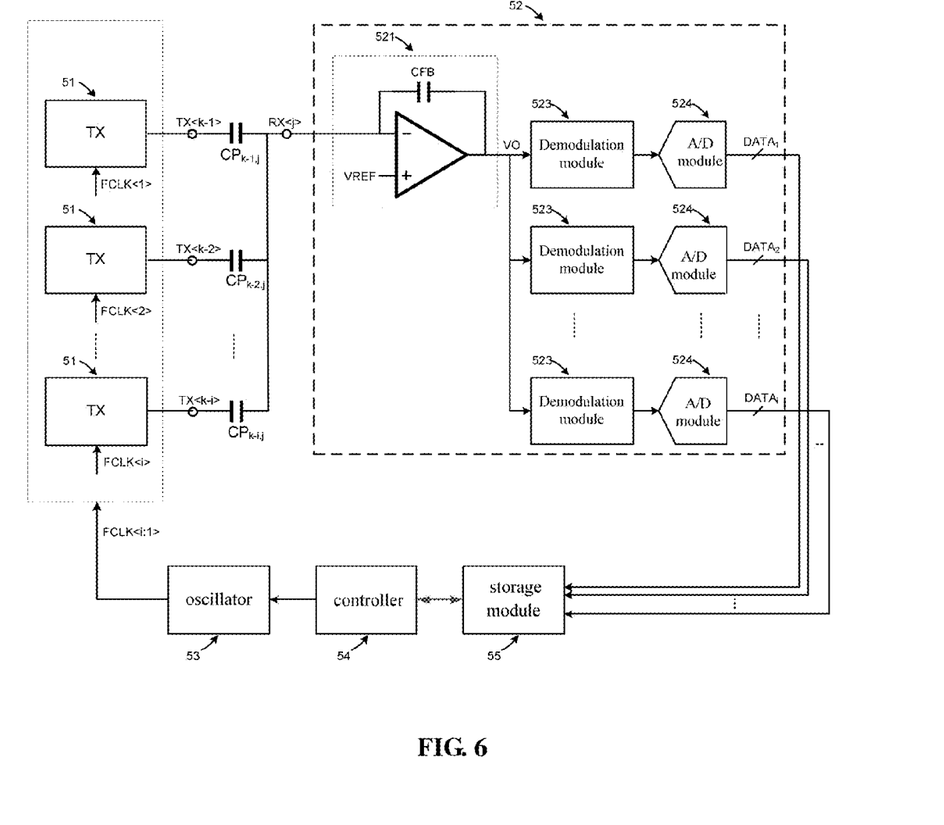
FIG. 6 is a structural diagram illustrating a device of driving and detection for a capacitive touch screen according to another embodiment of the present invention.

The embodiment above corresponds to the detection device shown in FIG. 6, in which the receiving side is different from that in the prior art where the signal is received from a single channel and undergoes single signal demodulation and the digital-to-analog conversion; therefore, rapid detection is achieved. The following detection steps are similar to those shown in FIG. 3.

Figure 5:
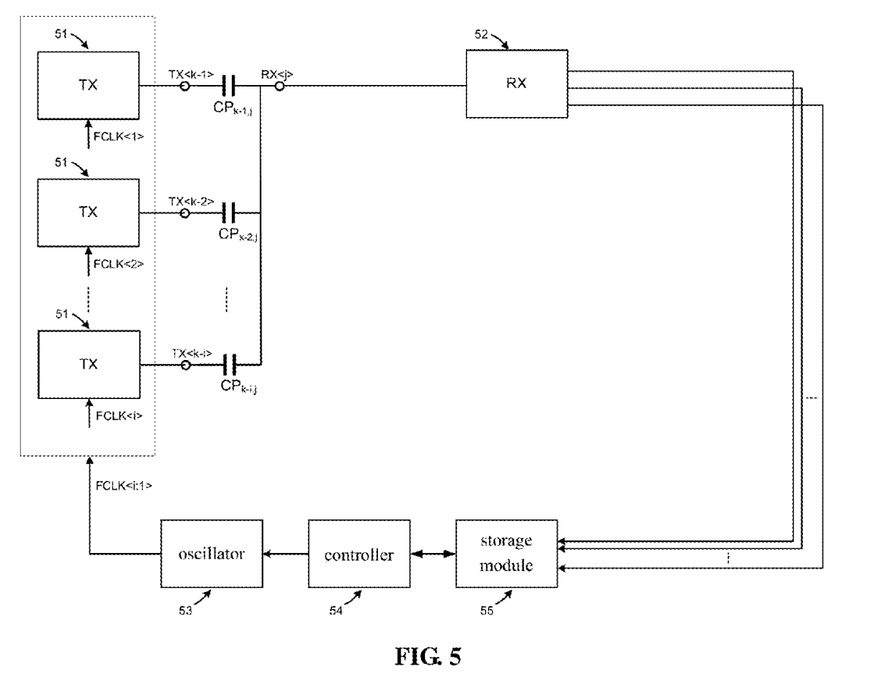
FIG. 5 is a structural diagram illustrating a device of driving and detection for a capacitive touch screen according to an embodiment of the present invention.

FIG. 5 shows a device of driving and detection for a capacitive touch screen, which includes:

a driving module 51, adapted to send, from a driving side, excitation signals through at least two channels simultaneously during the same driving and detection time period, where the excitation signals may have different frequencies;

a receiving module 52, adapted to, while the excitation signals are being sent, receive, through each of receiving channels, a charge signal generated from the excitation signals through coupling capacitances at corresponding touch detection points, and to perform detection including:

converting and amplifying the charge signal into a voltage signal, and performing signal demodulation and analog-to-digital conversion on the voltage signal; and storing digital signals obtained from the analog-to-digital conversion into a storage module, and analyzing the digital signals by a controller to obtain a detection result; and an oscillator 53, the controller 54 and the storage module 55, the storage module being adapted to store the detection result.

The receiving module 52 may include:

a power spectrum obtaining module, adapted to output the digital signals obtained from the analog-to-digital conversion and to perform Fourier analysis on the digital signals, to obtain a power spectrum over the frequencies.

FIG. 6 shows a implementation of a receiving module, as shown in FIG. 5, which includes:

an amplifier 521;

i signal demodulation modules 523 connected to an output terminal of the amplifier 521; and i analog-to-digital conversion modules 524 connected to output terminals of the signal demodulation modules 523, with output terminals of the i analog-to-digital conversion modules connected to an input terminal of the storage module, i being the number of the channels simultaneously driven by the driving module TX.

As to the functions and operating principles of the components shown in FIGS. 5 and 6, reference can be made to the descriptions corresponding to FIGS. 3 and 4, which are omitted here.

Therefore:

according to the method of driving and detection for a capacitive touch screen, the driving side sends excitation signals through a plurality of channels simultaneously during the same driving and detection time period, with excitation signals in at least two of the plurality of channels having different frequencies; and the receiving channels all perform receiving and processing, to output a power spectrums over the different frequencies. And in the device corresponding to the method, it is provided a signal demodulation module and an analog-to-digital conversion module for demodulation and analog-to-digital conversion on the frequencies. Therefore, rapid scan is achieved, the problem in the prior art with large size capacitive touch screens that scan frequency and frame rate are reduced because of the increased number of TX channels is avoid, frame rate in detection is increased, and the rapidity requirement for performing display driving and touch detection at different time slots can be met.

The embodiments herein are described in a progressive manner, and the description of each embodiment focuses on areas different from the other embodiments. The description of an embodiment may be referenced to portions of the other embodiments that are identical or similar. Particularly with regard to the device embodiment, the description is relatively simple because of its correspondence to the method embodiment.

Those skilled in the art will also understand that the exemplary units and steps described in the embodiments herein can be implemented with electronic hardware, computer software or a combination of both. For a better understanding of the interchangeability between hardware and software, the components and steps of the embodiments are described generally according to their functions. Whether the functions are implemented with hardware or software can be determined by the application of the technical solution or some design requirements. For any specific application, the functions described herein can be implemented by those skilled in the art using various methods; however, the implementations shall not be considered beyond the scope of the present invention.

The steps of the method described in the embodiments herein can be implemented with hardware, a software module executed by a processor or a combination of both. The software module may be located in Random Access Memory (RAM), memory, Read-Only Memory (ROM), electrically programmable ROM, electrically erasable programmable ROM, a register, a hard disk, a removable disk, CD-ROM, or any other form of storage medium that is known in the art.

The descriptions of the embodiments herein enable those skilled in the art to implement or use the present invention. Various modifications to the embodiments may be made by those skilled in the art, and the general principle of the present invention can be implemented in other embodiments without deviation the scope of the present invention. Therefore, the present invention shall not be limited to the embodiments disclosed herein, but in accordance with the widest scope consistent with the principles and features described herein.

What is claimed is:

1. A method of driving and detection for a capacitive touch screen, comprising:
   sending, from a driving side, excitation signals through a plurality of channels simultaneously during the same driving and detection time period, with excitation signals in at least two of the plurality of channels having different frequencies;
   receiving, by each of receiving channels at a receiving side, a charge signal generated from the excitation signals through coupling capacitances at corresponding touch detection points, and performing detection, which comprises:
   converting and amplifying the charge signal into a voltage signal, and performing signal demodulation and analog-to-digital conversion on the voltage signal; and
   storing digital signals obtained from the analog-to-digital conversion, and analyzing the digital signals by a controller to obtain a detection result.

2. The method according to claim 1, wherein, the step of sending, from a driving side, excitation signals through a plurality of channels simultaneously during the same driving and detection time period, with excitation signals in at least two of the plurality of channels having different frequencies comprises:
   driving, by a driving module TX during the same driving and detection time period, i channels simultaneously to send excitation signals having different frequencies.

3. The method according to claim 2, wherein, the step of receiving, by each of receiving channels at a receiving side, a charge signal generated from the excitation signals through coupling capacitances at corresponding touch detection points, and performing detection, while the excitation signals are being sent comprises:
   while the excitation signals having different frequencies are being sent through the i channels, receiving, by a receiving module RX through each of the n channels in the vertical direction, i charge signals caused by the driving module TX, with i*n touch detection points formed by all the n RX channels and the i TX channels; and
   adding the charge signals generated from the excitation signals in the i TX channels through coupling capacitances at i touch detection points, to form a charge signal received by the RX.

4. The method according to claim 2, wherein the step of converting and amplifying the charge signal into a voltage signal, and performing signal demodulation and analog-to-digital conversion on the voltage signal comprises:
   converting and amplifying, by an amplifier, the charge signal into a voltage signal;
   inputting the voltage signal into i signal demodulation modules, to obtain i demodulated signals; and
   inputting the i demodulated signals into i digital-to-analog converters connected with the signal demodulation modules, to obtain i digital signals: DATA1 to DATAi.

5. The method according to claim 2, wherein the step of driving, by a driving module TX, i channels simultaneously to send excitation signals having different frequencies comprises:
   driving, by the driving module TX, 3 channels simultaneously to send the excitation signals having different frequencies; and driving another 3 channels at a starting point of the next driving and detection time period.

6. The method according to claim 1, further comprising:
outputting the digital signals obtained from the analog-to-digital conversion and performing Fourier analysis on the digital signals, to obtain a power spectrum over the frequencies.

7. A device of driving and detection for a capacitive touch screen, comprising:
a driving module, adapted to send, from a driving side, excitation signals through at least two channels simultaneously during the same driving and detection time period;
a receiving module, adapted to, while the excitation signals are being sent, receive, through each of receiving channels, a charge signal generated from the excitation signals through coupling capacitances at corresponding touch detection points, and to perform detection, which comprises:
converting and amplifying the charge signal into a voltage signal, and performing signal demodulation and analog-to-digital conversion on the voltage signal; and
storing digital signals obtained from the analog-to-digital conversion into a storage module, and analyzing the digital signals by a controller to obtain a detection result; and an oscillator, the controller and the storage module, the storage module being adapted to store the detection result.

8. The device according to claim 7, wherein, the receiving module comprises:
a power spectrum obtaining module, adapted to output the digital signals obtained from the analog-to-digital conversion and to perform Fourier analysis on the digital signals, to obtain a power spectrum over the frequencies.

9. The device according to claim 7, wherein the receiving module comprises:
an amplifier;
i signal demodulation modules connected to an output terminal of the amplifier; and
i analog-to-digital conversion modules connected to output terminals of the signal demodulation modules,
with output terminals of the i analog-to-digital conversion modules connected to an input terminal of the storage module, i being the number of the channels simultaneously driven by the driving module TX.

10. The device according to claim 9, wherein, i, the number of the channels simultaneously driven by the driving module TX, is 3.

* * * * *